United States Patent [19]

Rouverol

[11] 4,276,785
[45] Jul. 7, 1981

[54] LOW-NOISE GEARING

[76] Inventor: William S. Rouverol, P.O. Box 9122, Berkeley, Calif. 94709

[21] Appl. No.: 94,798

[22] Filed: Nov. 16, 1979

[51] Int. Cl.³ .................................. F16H 55/06
[52] U.S. Cl. .................................. 74/462; 74/457
[58] Field of Search ............... 74/462, 461, 460, 457

[56] References Cited

U.S. PATENT DOCUMENTS

| 3,251,236 | 5/1966 | Wildhaber | 74/462 |
| 3,269,205 | 8/1966 | Niemann | 74/462 |
| 3,438,279 | 4/1969 | Rouverol | 74/462 |
| 3,631,736 | 1/1976 | Saari | 74/462 |
| 3,881,364 | 5/1975 | Rouverol | 74/462 |
| 3,918,315 | 11/1975 | Rouverol | 74/462 |
| 3,937,098 | 2/1976 | Rouverol | 74/462 |
| 3,946,621 | 3/1976 | Rouverol | 74/462 |
| 4,031,770 | 6/1977 | Ishikawa | 74/462 |
| 4,108,017 | 8/1978 | Rouverol | 74/462 |
| 4,149,431 | 4/1979 | Rouverol | 74/462 |

OTHER PUBLICATIONS

Article entitled "Maximum Conjugacy Gearing", published in Power Transmission Design, Apr. 1979.
"Gear Design and Application", edited by Nicholas P. Chironis, published by McGraw Hill, 1967 (pp. 48, 69–77).
Addendum No. 1 (1959) to B. S. 978: Part 2: 1952 (British "Double Circular Arc", system).
"Analytical Mechanics of Gears", published by Dover, 1963, p. 48, written by E. Buckingham.

Primary Examiner—C. J. Husar
Assistant Examiner—Conrad Berman

[57] ABSTRACT

A gear tooth form is disclosed that maximizes the profile (transverse) contact ratio for coplanar axis gearing. As the tooth form allows teeth two or three times as fine as those of conventional involute gearing to be used without loss of torque capacity, the face (axial) contact ratio for helical or spiral bevel gearing is also maximized. The total contact ratio (profile plus face contact ratios) is therefore maximized, and the torque load is divided over the maximum number of teeth. This minimizes the transmission error, which in turn minimizes operating noise and vibration. The gearing employs a minimum pressure angle and a path of contact that includes a curved portion.

16 Claims, 5 Drawing Figures

LOW-NOISE GEARING

This invention concerns the profiles of gear teeth, and specifically it concerns the shaping of these teeth so that the maximum possible number of them will be in contact during operation. The invention comprises an improvement over the disclosures of U.S. Patent Application Ser. No. 931,855, which disclosures were also incorporated in a technical article entitled "Maximum-Conjugacy Gearing" published in the April, 1979, issue of "Power-Transmission Design".

The noise and vibration of gears varies greatly will the gear type. Worm gears, including both the edge engaging and face-engaging ("Spiroid") types nearly always run quitely. This is partly because worm-type teeth mesh at a very oblique angle, so the relative velocity of engagement is small, and partly because worm-type gears can be designed for very large contact ratios. (See for example "Gear Design and Application", edited by Nicholas P. Chironis, McGraw-Hill, 1967; pp. 48, 69–77.) The reason a large contact ratio is effective in minimizing noise and vibration is that dividing the torque load over a large number of teeth reduces the "transmission error", as the minute variations in effective speed ratio are sometimes called.

Worm gears are not suited for most gearing applications, however, because the range of speed ratios is so high and the efficiencies are so low. For most low and medium ratio gear sets, gears having coplanar axes are used, even though they do not run as smoothly. Tooth engagement velocities normal to the tooth surface can be reduced to some extent by using moderate helix angles (or, in bevel gears, spiral angles), but if these angles are too large, torque capacity is limited. Further, with conventional involute gears the contact ratio in the direction of motion is limited to the range from about 1.3 to 2, and this leads to considerable transmission error even in gears that are carefully machined.

The object of the present invention is therefore to devise a tooth form that will afford the maximum possible profile (transverse) contact ratio for gears having smaller ratios than those of worm gears. The transverse contact ratio for such gearing cannot be as great as in the case of worm-type gears because of the more rapid convergence (and divergence) of the pitch circles on either side of the pitch point, but the invention discloses a method of making the most of what geometric possibilities do exist. In general, the proposed tooth form allows the transverse contact ratio to be approximately doubled, typically to a range from about 2.5 or 2.75 to about 6.

The essential method of the invention is to maintain tooth contact over a path that is exceptionally long relative to the tooth height, by using as small a pressure-angle as possible, then eliminating the profile interference that occurs in low pressure-angle involute gears by using suitable curves in the tooth contact path. If these curves are correctly chosen, teeth two or three times finer than conventional involute teeth may be used without loss of any torque capacity, allowing tooth numbers to be increased proportionately and, if a helix or spiral angle is present, giving much higher face (axial) contact ratios. The "total contact ratio" (profile plus face contact ratios), which represents the average number of teeth that share the load, is therefore maximized, and the operating noise and vibration is minimized.

The prior art discloses a number of gear types that employ curved paths of contact. Some of these gear types also have a low pressure-angle in the vicinity of the pitch point, ranging from 0° to 10°, as for example the British "Double Circular Arc" system, of Standard 978 Part 2-1952, Addendum No. 1-1959; or the now obsolete $14\frac{1}{2}°$ "composite system". These gears are among the many that employ cycloidal profile portions in order to allow use of small numbers of teeth on the pinion. Minimum tooth numbers are governed by the requirement that if the tooth profiles are not to have cusps, all portions of the path of contact must have normals that pass between the gear centers. The reasons for this are explained by Buckingham ("Analytical Mechanics of Gears", Dover, 1963, p. 48). To meet this requirement, contact paths for pinions with small tooth numbers must have large slopes at the ends of the path that are often 30° or larger. However, it is of historical interest to note that to a great extent these cycloidal-type gear systems have been supplanted by the 20° (and 25°) involute system, which with the aid of addendum modification permits pinions with only 8 or 9 teeth to be made without undercutting (cusping). These small tooth numbers are especially useful in applications requiring large reductions per stage, as for example, gear trains for clock mechanisms.

The objectives of the tooth profiles disclosed in the present specification are essentially just the opposite of those of cycloidal-type gears. Instead of making it possible to use small tooth numbers, the objective is to make large tooth numbers practicable. To minimize noise and vibration it is desirable that the pinion have at least 30 to 36 teeth, and whenever possible 50 or 60. To be able to employ such fine teeth without loss of torque capacity, it is necessary to divide the load over as many teeth as possible, and this requires that the curvature introduced into the ends of the contact path be as small as possible rather than as large as possible. Only in this way can the transverse contact ratio be maximized. Typically, the variation in path slope is therefore limited to one-third to one-tenth of that employed in cycloidal-type gears, which means that in all cases it will be less than 20°.

Other types of prior art gearing that employ curved paths, and the purposes of the curvature (in parentheses), are as follows: U.S. Pat. No. 3,937,098 (increased permissible surface load); U.S. Pat. No. 3,251,236 (reduced tooth impact); U.S. Pat. No. 3,631,736 (reduced variation in Hertz stresses); and U.S. Pat. No. 3,946,621 (fluid entrapment, utilizing contact paths having average pressure-angles of 20° to 50°). Buckingham (op. cit.) also shows a large number of curved contact paths, as in his FIGS. 1-2, 1-3, 1-5, 1-8, 1-10, 1-11, 1-12, 1-14 and 1-15 (instructional, to illustrate the principal of gear profile analysis in a more general way than is possible if only the straight line involute path is considered).

It is a primary objective of the present invention to disclose the means by which curved paths of contact can be made practicable in power transmission gearing. It will be evident that all curved paths of contact, including those disclosed by Buckingham and the prior art patents listed above, must by their nature involve a varying pressure angle and therefore give rise to tooth forces that vary in direction during the meshing cycle. If the transverse contact ratio is small, these fluctuating load components normal to the mean pressure line cause noise and bearing vibration. But if the transverse contact ratio is large, as in the gearing disclosed herein, these fluctuating components will be phase-summed to produce a resultant that is negligibly small, especially if the path curvature is made as small as possible.

The means to achieve the special objects and advantages of the invention will be evident from the drawings as explained in the specification that follows.

Figure 1:
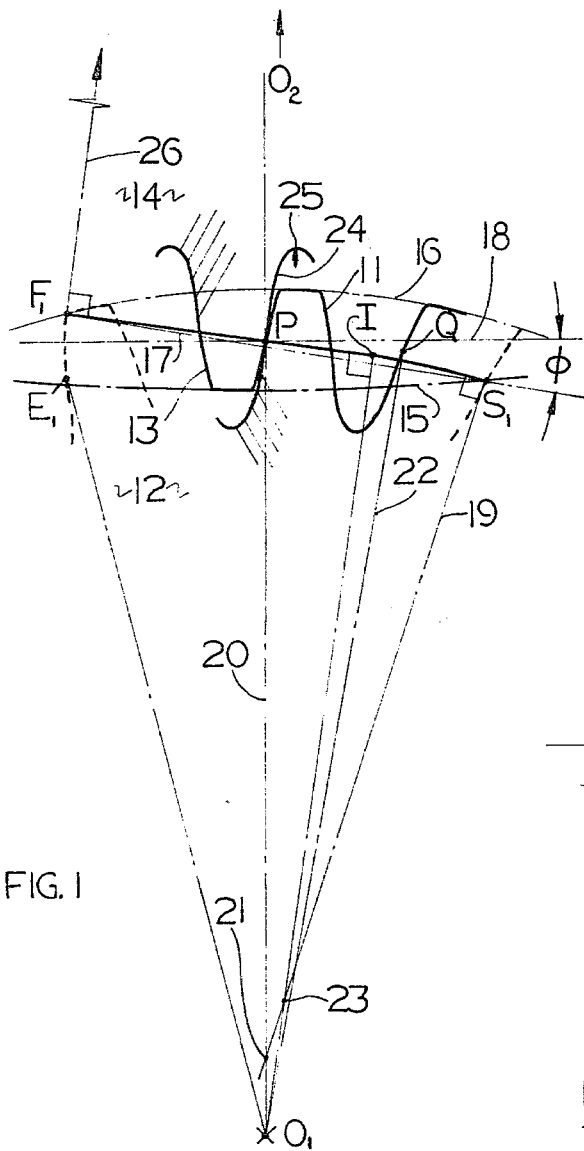
FIG. 1 is a partial section of a pair of mating helical gears taken perpendicularly to the common pitch element (i.e., "transversely") and showing mating tooth profiles embodying the invention.

In detail, and referring to FIG. 1, typical teeth 11, 13 embodying the invention are shown in transverse section engaged at pitch point P. Tooth 11, at right, is on the smaller gear 12 (pinion), which has its center at $O_1$, and tooth 13, at left, is on the larger gear 14, which has its center at $O_2$ (off the drawing). Other parts of pinion 12 and gear 14, such as hubs, webs, rims, keyways, etc., are standard and are omitted in the interest of clarity.

In the embodiment illustrated in FIG. 1, pinion 12 is driving in the counterclockwise direction and contact between the mating teeth takes place over a curved path that starts at point $S_1$ on the addendum circle 15 of gear 14, passes through the pitch point P, and ends at point $F_1$ on the pinion addendum circle 16. (In a speed increaser the direction of movement of the point of contact along the path is of course reversed.) The path segment $S_1I$ is concave toward the pinion 12, but the main portion of the path, $IPF_1$, is straight.

A straight line 17 joining $S_1$ and $F_1$ makes an angle $\phi$ with the common tangent plane. This plane is shown in edge view as line 18, which is also the line tangent to the pitch circles (not shown) of the pinion 12 and the gear 14. In order to maximize the transverse contact ratio, the angle $\phi$, which in this specification will be designated as the "average pressure angle", must be made smaller than 14°. The optimum angle $\phi$ that will still allow the use of a "constant profile" (sharpenable) hob is from 7° or 8° to about 10°. In some cases, such as gears having a ground finish, average pressure angles as small as 5° or 6° may be found to be practicable.

The angle through which a pinion or gear turns while a given tooth is in contact with its mate is called the "angle of action" or "roll angle". In FIG. 1 the pinion roll angle is the angle $S_1O_1E_1$. FIG. 1 also shows the pinion pitch angle, which is angle $PO_1Q$ (where Q is a point on the pinion pitch circle for the profile of the first tooth to the right of tooth 11). The quotient of the roll angle $S_1O_1E_1$ and the pitch angle $PO_1Q$ is the transverse contact ratio. It is this ratio that is maximized by minimizing the pressure angle $\phi$.

FIG. 1 also shows why it is advantageous, when the pressure angle is small, to use a path of contact that has a curved portion rather than one that is entirely straight. It will be noted from FIG. 1 that the normal 19 to the path of contact at $S_1$ intersects the line of centers 20 at a point 21 just inside the pinion center at $O_1$. (In the case illustrated the distance 21-$O_1$ is substantially less than a fourth of the distance 21-P.) If the point 21 lay outside of $O_1$, this would mean that somewhere between P and $S_1$ there must be a point where the normal to the path passed exactly through $O_1$. If the path extended beyond such a point (called the "interference point") it would have to contain points equidistant from $O_1$ that to obey the Law of Gearing would have to have different pressure angles (one negative and one positive). In other words, a single point on the tooth profile would have to make two different angles with respect to the radius vector. As this is not possible the hob simply produces a cusp on the tooth profile and no contact with the mating tooth occurs beyond this "interference point". The interference point for involute profiles is shown in FIG. 1 as point I.

In gearing which employs involute profiles alone, the path of contact cannot extend beyond the point I. This means the maximum possible approach roll angle is limited to the angle $IO_1P$, which is the pressure angle for the involute segment of the path $IPF_1$. Since both torque capacity as transverse contact ratio are directly proportional to the roll angle, this limitation is highly undesirable. The solution, according to the present invention, is to increase the roll angle by extending the contact path with a curved line $IS_1$, all normals to which pass above $O_1$ (such as the normal at $S_1$ which intersects line $PO_1$ at point 21, as noted). A circular arc with its center at point 23, where the normal to the path at $S_1$ intersects $IO_1$, is one of several curves that may be employed for the segment $IS_1$. In practice a non-uniform radius curve that is associated with a uniform radius curve on the hob profile is found to be preferable. The reasons for this will be explained in connection with FIG. 2.

Other features shown in FIG. 1 include a tooth flank portion 24 that has a radius of curvature of at least one tooth module, which is considerably longer than the tooth root radius 25. The purpose of this long radius flank portion 24 is to minimize the tooth root stress concentration factor, and at the same time increase the tooth depth and hence its flexibility, so torque load will be distributed as equitably as possible. The whole depth of the teeth is characteristically at least 2.6 modules, and preferably 3 or more. When additional bending strength is needed, these deep tooth roots may be shot peened or nitrided.

FIG. 1 also shows the normal 26 to the path at $F_1$. When the gear ratio is large enough, there is no interference problem on the recess side of the path, because the normal line 26 will intersect the line joining the pitch point P to the center of gear 14 at a point below $O_2$ even though there is no curvature in the recess segment $PF_1$ of the path. In effect, the recess path segment $PF_1$ is a typical involute path, except for the very low pressure-angle.

Figure 2:
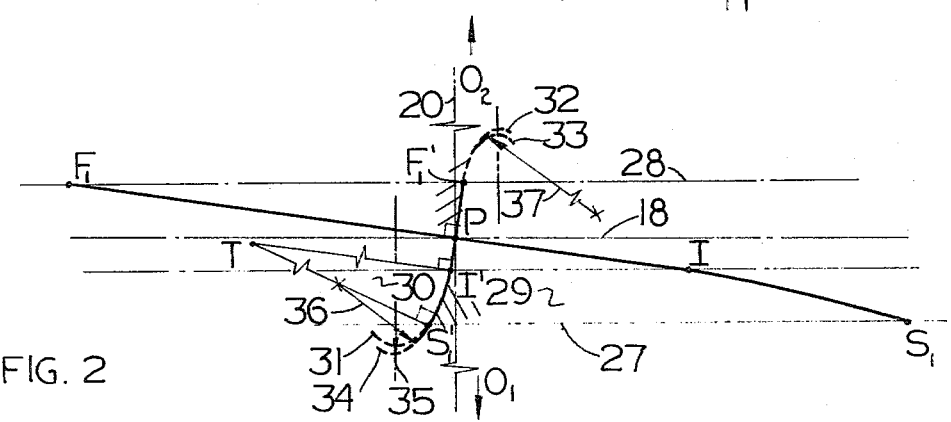
FIG. 2 is a diagram showing the path of contact of the teeth of FIG. 1 and also the basic rack profile associated with that path, enlarged to twice the scale of FIG. 1.

In FIG. 2 the path $S_1IPF_1$ of the gears 12, 14 shown in FIG. 1 has been diagrammed separately to show its relation to its basic rack profile $S_1'I'PF_1'$, which is in effect a foreshortened version of the path rotated 90°. As those skilled in the art will be aware, the establishment of the path of contact of a pair of conjugate gears fully determines the basic rack profile for the pair (Buckingham, op. cit., pp. 15–17). The basic rack profile, in turn, fully determines the shape of the mating conjugate profiles (Buckingham, op. cit., p. 4). Consequently the specification of the path of contact for a pair of conjugate gears completely specifies the shapes of the gear tooth profiles.

If the standard basic equations for finding the basic rack profile are applied to the path $S_1IPF_1$, it will be found that the straight portion of the path $IPF_1$ produces a straight rack portion I'PF$_1$', and the curved segment S$_1$I produces a curved rack portion S$_1$'I'. In practice it is easiest for the hob maker to produce a circular arc curve, in preference to other curve forms. If the hob is made in this way, the segment S$_1$'I' will be a circular arc if the gear set has spur teeth, or a segment of an ellipse if the gears are helical. In the latter case, the standard equations for transforming normal plane profiles to transverse plane profiles and vice versa are used. (Buckingham, op. cit., pp. 143-146; as Buckingham notes, on pg. 142, the spur and helical gear equations for paths of contact and basic rack profiles are the same if the analysis is made in the transverse plane. This is why all the figures shown herein are transverse plane views.)

Although FIG. 2 shows the basic rack profile S$_1$'I$_1$'PF$_1$40 superimposed on the path S$_1$I$_1$PF$_1$ at the pitch point P, it will be evident that in generating the conjugate profiles that are to contact along the given path, the basic rack profile translates laterally, with S$_1$' and F$_1$' remaining on the parallel lines 27, 28 starting at a position in which S$_1$' coincides with S$_1$ and ending with a position in which F$_1$' coincides with F$_1$. (For any conjugate gear pair, the path for profile generation is identical to the path for meshing.) There is one further requirement, however, which is that a pair of mating gears will have conjugate action only if they are generated by opposite sides of the same basic rack profile. Thus the hob or generative grinding wheel for the gear 14 must have teeth 29 shaped to the transverse plane profile form 31-S$_1$'I'PF$_1$'-32, while that for the pinion 12 must have teeth 30 shaped to the profile form 33-F$_1$'PI'S$_1$'-34. The latter profile form may be perceived more readily by turning FIG. 2 upside down, or by noting that the transverse plane hob working tooth for the pinion 12 corresponds to the inverted hob tooth space for the gear 14.

FIG. 2 also shows a feature that is particularly advantageous with low pressure-angle gearing. If the gear set is a spur gear set, the curved segment I'S$_1$' is a circular arc of radius S$_1$'T(or I'T) which is typically larger than four tooth modules. Between the curve I'S$_1$' and the small radius 35 of the hob tip, an intermediate radius 36 (or 37) is interposed. Because it has a length of at least one tooth module, which is several times that of the tip radius 35, this intermediate radius 36 (or 37) affords a tooth root stress concentration factor that is substantially smaller than that for conventional involute gearing.

Figure 3:
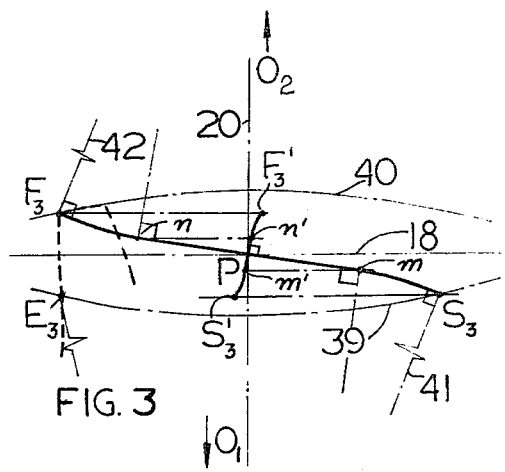
FIGS. 3, 4 and 5 are diagrams of the transverse plane area lying between the addendum circles of pairs of mating gears embodying the invention and showing alternative paths of contact together with the basic rack profiles associated with those paths.

FIG. 3 is a transverse plane diagram of an embodiment of the invention best suited for gear ratios of unity or slightly larger. This figure shows a flat S-shaped path S$_3$F$_3$ that stretches between the addendum circles 39, 40 of the mating gears and includes a straight portion m-n that connects the interference points for involute profiles m, n. Beyond m and n respectively are curved portions mS$_3$ and nF$_3$ that have normals such as 41 and 42 that intersect the line of centers 20 at points between the gear centers at O$_1$ and O$_2$ (off the drawing). As in the case of the embodiment of FIGS. 1 and 2, the addition of curved portions mS$_3$ and nF$_4$ greatly increases the gear set's roll angle and thereby its torque capacity and transverse contact ratio as well.

Superimposed on the contact path S$_3$mnF$_3$ in FIG. 3 is its basic rack profile S$_3$'m'n'F$_3$'. This rack profile is again a foreshortened version of the path, in that it has a straight portion m'n' adjacent to the pitch point P extending into curved segments S$_3$'m' and F$_3$'n' at its ends. If desired, the path and its associated basic rack profile may be made symmetrical with respect to the pitch point, in which case the same hob may be used to generate both members of a gear pair, even if they have different numbers of teeth.

Figure 4:
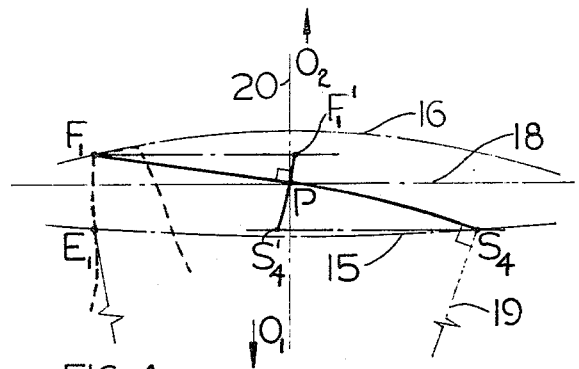
Figure 5:
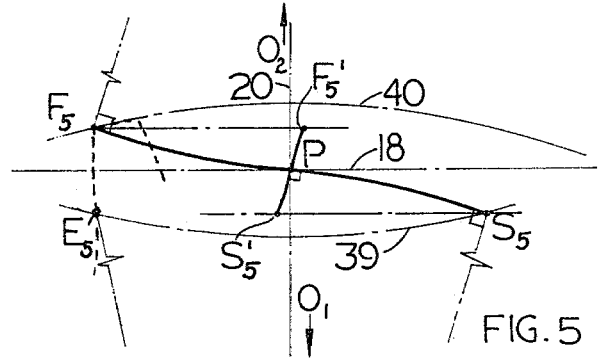

FIGS. 4 and 5 show modifications of the S-shaped and J-shaped paths and basic racks of FIGS. 2 and 3 respectively. In both cases the curved segments, S$_4$P, S$_5$P and F$_5$P, run from the respective addendum circles 15, 16, 39, 40 all the way to the pitch point P and produce corresponding continuous curved portions in the basic racks, S$_4$'P, S$_5$'P and F$_5$'P. The main advantages of these modified paths is that they simplify the hob manufacture slightly and allow for tooth profile relief that runs all the way to the pitch point and is therefore effective at part load as well as full load. In FIG. 4 the path segment F$_1$P and the basic rack segment F$_1$'P are straight, as in the embodiment of FIGS. 1 and 2.

It should be noted that the figures shown and described herein are for geometrically conjugate gears. Most involute gears with transmitted loads in excess of about 1000 lbs. per inch of face width (17.86 kp. per mm) are given "profile modification" (also called "figuring") to correct for tooth deflection under load and machining errors. Such modifications introduce slight deviations from straightness in both the path of contact and the basic rack profile. These deviations are introduced for entirely different purposes than those shown in the accompanying drawings and are distinguishable from them in several ways: (1) optimization of the gearing herein disclosed requires larger deviations than those employed for tip, or tip-and-root, relief of conventional involute gears, which involve variations in path slope of about 1.5° at most; (2) involute profile relief is obtained by making the generating tip, or tip and flank, of the basic rack slightly concave, so extra material is removed from the tooth at the top, or top and bottom, of the working profile, whereas in the case of the gearing herein disclosed the basic rack profile for at least one of the mating gears has a convex portion (pinion profile 33-F$_1$'PI'S$_1$'-34 in FIG. 2, segment m'S$_3$' or n'F$_3$' in FIG. 3, segment PS$_4$' in FIG. 4, and segment PS$_4$' or PF$_5$' in FIG. 5); and (3) conventional methods of relieving standard involute gears may be applied to the gearing herein disclosed, by adding a slight amount of material to the tips and/or roots of the basic racks, the effects of which would be superimposed on the already non-straight paths and basic rack profiles shown.

A number of further observations may be made with respect to the herein disclosed gearing: (a) The gearing obtains very large transverse contact ratios without requiring the radial preloading called for in prior art patent U.S. Pat. No. 4,149,431. (b) As in the case of conventional high-ratio involute gear sets, unequal addenda may be utilized. The inequality (about 5% in FIG. 1) may be included in the hob design or may be obtained during cutting by advancing the hob for the gear and retracting that for the pinion. In either case, the inequality, which may make the gear addendum only a third or less of the pinion addendum, permits the curved segment of the hob I'S$_1$' to be shorter but has the disadvantage of reducing the total roll angle and greatly increasing the wear and scoring hazard at the end of the contact path. (c) The roll angle (e.g., angle S$_1$O$_1$E$_1$ in FIG. 1) is increased not only by minimizing the average pressure angle $\phi$ but also by maximizing the addendum heights of both members of the mating pair. It is therefore generally advantageous to use addendum coefficients that have a sum greater than 2.0. (d) The system is applicable not only to spur and helical gears but also internal gears and straight and spiral bevel gears. In the case of bevel gears, the surface in which characteristic meshing action occurs is not a plane, as it is in parallel-axis gear sets, but a spherical surface. In applying the present invention to bevel gearing, the transverse plane views of the drawings should therefore be construed as projections of this spherical transverse surface onto a plane normal to the common pitch element. The common pitch element is shown in end view as the pitch point P, as in the case of spur and helical gearing, but for bevel gearing the line 20 represents an edge view of the plane containing the gear axes. (e) It is possible to replace part or all of the straight path segment $PF_1$ in FIGS. 1, 2 and 4 by a curved segment that is concave toward the pinion 12. This would give the path a flat C-shape instead of the J-shapes and S-shapes illustrated in the various figures. A C-shaped path would have advantages only if the gear ratio is quite large and the minimum permissible pressure angle for the hob decreases with distance from the pitch point. (f) If desired, the segments shown as curved in FIGS. 1, 2, 3 and 4 may be replaced by their chords, in which case the paths and basic rack profiles illustrated could be made up of sets of two or three interconnected non-colinear straight lines.

To clarify the scope of the ensuing claims, the following definitions are provided: "not preloaded" means that no components of force are urging the gears toward each other when no torque is being transmitted; "tools" means hobs, shaper cutters, shavers or generative grinding wheels (Reishauer) used to rough cut or finish gears embodying the invention; "non-straight" means including a curved portion or a portion made up of a pair of non-colinear straight lines.

I claim:

1. A pair of mating gears that are not preloaded, are mounted on coplanar axes, and have conjugate teeth formed to make contact, when said gears are transmitting torque, over a transverse plane path of contact that affords a ratio of roll angle to pitch angle of at least 2.5, said path being non-straight and having an average pressure-angle smaller than 14°.

2. A pair of mating gears according to claim 1 wherein the number of teeth on each of said gears is at least 30.

3. A pair of mating gears according to claim 1 wherein the number of teeth on each of said gears is at least 36.

4. A pair of mating gears according to claim 1 wherein said teeth are slantingly disposed with respect to the common pitch element of said pair.

5. A pair of mating gears according to claim 1 wherein said ratio is at least 2.75.

6. A pair of mating gears according to claim 1 wherein said average pressure-angle is smaller than 10°.

7. A pair of mating gears according to claim 1 wherein said average pressure-angle is smaller than 8°.

8. A pair of mating gears according to claim 1 wherein said path has an S-shape.

9. A pair of mating gears according to claim 1 wherein said path has a J-shape.

10. A pair of mating gears according to claim 1 wherein one of said pair is smaller than the other and said path has at least one segment that is concave toward said one of said pair.

11. A pair of mating gears according to claim 1 wherein said path includes a straight portion adjacent to the pitch point.

12. A pair of mating gears according to claim 1 wherein the whole depth of the teeth of one of said pair is greater than 2.6 tooth modules.

13. A pair of mating gears according to claim 1 wherein the transverse profiles of the teeth of one of said pair include a dedenum segment that lies between the working profile and the minimum radius root curve, said segment having a minimum radius of curvature of at least one tooth module.

14. A pair of mating gears according to claim 1 wherein the sum of the addendum heights of the teeth of said pair is greater than 2.0.

15. A pair of mating gears according to claim 1 wherein the normal to said path at one of its ends intersects the shortest line between the pitch point and the axis of one of said gears at a point four times closer to said axis than to said pitch point.

16. A pair of mating gears according to claim 1 wherein said teeth have unequal addendum heights.

* * * * *

UNITED STATES PATENT AND TRADEMARK OFFICE
CERTIFICATE OF CORRECTION

PATENT NO. : 4,276,785
DATED : July 7, 1981
INVENTOR(S) : William S. Rouverol

It is certified that error appears in the above-identified patent and that said Letters Patent is hereby corrected as shown below:

Column 8, line 37, claim 14, "heights" should read -- coefficients --.

Signed and Sealed this

Twenty-sixth Day of June 1984

[SEAL]

Attest:

GERALD J. MOSSINGHOFF

Attesting Officer  Commissioner of Patents and Trademarks